United States Patent [19]
Weber

[11] Patent Number: 4,937,694
[45] Date of Patent: Jun. 26, 1990

[54] CAPACITOR ELEMENT WITH PATTERNED ELECTRODE AREAS FOR CAPACITIVE MEASURING DEVICE

[76] Inventor: Hans R. Weber, 10, chemin du Grillon, CH-1007 Lausanne, Switzerland

[21] Appl. No.: 350,558
[22] PCT Filed: Jun. 23, 1988
[86] PCT No.: PCT/CH88/00113
§ 371 Date: Mar. 29, 1989
§ 102(e) Date: Mar. 29, 1989
[87] PCT Pub. No.: WO89/00277
PCT Pub. Date: Jan. 12, 1989

[30] Foreign Application Priority Data
Jun. 29, 1987 [CH] Switzerland ............... 2446/87
[51] Int. Cl.⁵ .............. H01G 13/00; H01G 7/00; H01G 5/06
[52] U.S. Cl. ................... 361/280; 361/298; 29/25.42
[58] Field of Search ............ 361/280, 298, 299; 29/25.42

[56] References Cited
U.S. PATENT DOCUMENTS
2,674,729 4/1954 Carter .................. 361/298 X
3,681,828 8/1972 Mezey .................. 29/25.42
4,182,981 1/1980 Shum et al. ............. 361/280 X Primary Examiner—Donald A. Griffin
Attorney, Agent, or Firm—Sherman and Shalloway

[57] ABSTRACT

In order to so improve capacitive measuring devices equipped with capacitor elements having patterned electrode areas that they shall allow more accurate measurement and higher resolution than conventional elements of this design, the capacitor elements evince an absence of contact holes passing through the electrode areas where they might be located in the active capacitor zones. Because the electrode areas (11) are deposited on a substrate (13) with pre-fabricated contact holes or ducts (12), and because conducting strips (14) are present on the other side of the substrate (13) while passing through the contact holes (12) in said substrate layer and are connected to the back side of the electrode areas (11), capacitor elements are achieved free of any contact holes or points on the side of the electrode areas. As a result, and for the first time, the contact locations required for each electrode area of such capacitor element can be placed in the active capacitor zone without thereby affecting the precision/accuracy and the values electrically detected. Thereby a capacitor element of predetermined size may receive a multiple of electrode areas compared to conventional designs.

3 Claims, 1 Drawing Sheet

U.S. Patent     Jun. 26, 1990     4,937,694
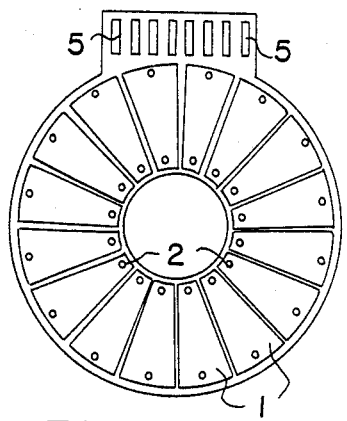
FIG. 1
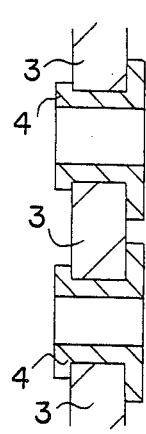
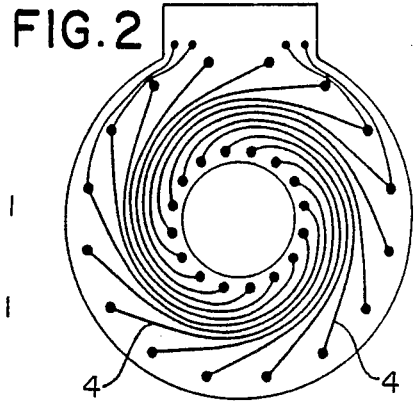
FIG. 2
FIG. 3
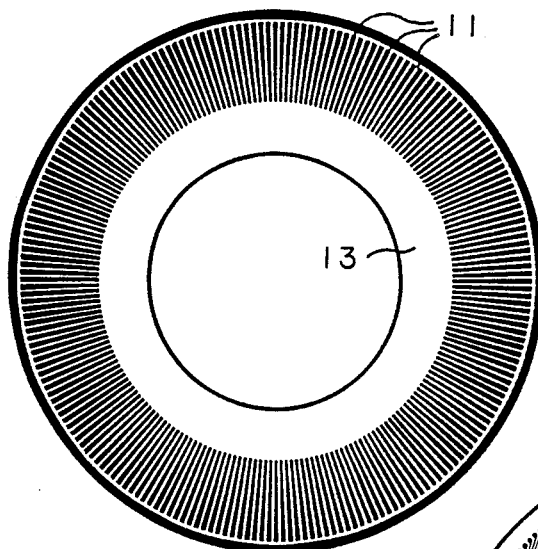
FIG. 4
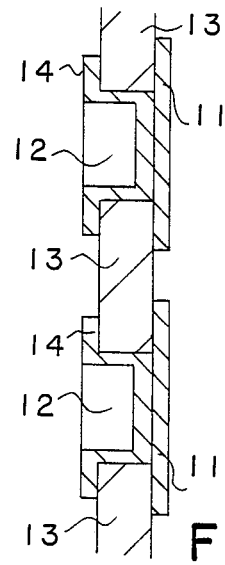
FIG. 6
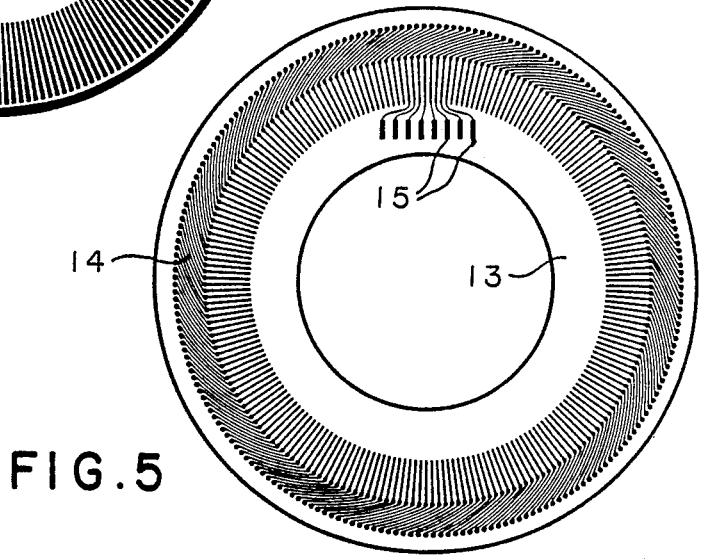
FIG. 5

CAPACITOR ELEMENT WITH PATTERNED ELECTRODE AREAS FOR CAPACITIVE MEASURING DEVICE

BACKGROUND OF THE INVENTION

1. Field of the Invention

The present invention concerns a capacitor element with patterned electrode-areas for capacitive measuring devices.

More particularly, the present invention concerns a capacitor element with patterned electrode areas for capacitive measuring devices, with mutually displaceable capacitor parts to vary the capacitance of the measuring device as a function of the relative positions of the capacitor parts, wherein a plurality of individual electrode areas are arranged on a first side of an insulating substrate and conducting strips electrically connecting these areas to each other and to terminals being disposed on a second side of the substrate.

2. Description of the Prior Art

Applications are known wherein capacitive measuring devices with mutually rotating capacitor parts are used for measuring rotation. Again, capacitive measuring devices are known to be used for linear applications where the parts of a capacitor are displaced linearly relative to each other. The accuracy of measurement and/or resolution of such angular and linear measuring devices within their measuring range essentially depends on the fineness of the graduation of the capacities of these measuring elements. This means that, for a measuring device for angles with electrode-areas in the form of circle-sectors, the resolution of the measurable angular difference improves as more sectors are defined on the measuring device, i.e. with an increase in the number of sector electrode-areas on its capacitive element. In identical manner, as regards linear measuring devices for measuring lengths, the resolution of the measurable differences in distance is higher with an increase in the number of electrode-areas per unit length on the capacitive element.

The individual electrode-areas must be connected electrically to each other and to the electronic circuit analyzing the capacitance of the measuring device corresponding to an arbitrary position of its capacitive elements, so that each electrode area is provided with at least one contact point. Such connections ordinarily are arranged on the back side of the capacitor element, due to the arrangement and geometry of the electrode areas. Conventionally, the contacts are implemented by boreholes or apertures passing through the electrode areas and the substrate bearing said areas, whereby the electrode areas are contacted on the back side of the capacitor element. The size and the position of these boreholes or apertures not only affect the capacitance of every electrode area, if arranged in the active capacitor zone, but also essentially defines the minimum dimensions of the electrode areas. In practice this makes it difficult to manufacture capacitor elements with sector electrode-area patterns of small diameters which contain a large number of such sector electrode-areas. For the same reasons, even linear capacitive measuring devices require minimal widths for the electrode areas, to reliably overlap the contact-holes in the substrate. That means that the resolution of rotational and linear motion is limited considerably, because relatively large mechanical motions are required to change the capacitance of the measuring device. It is obvious that, especially in high precision measurements, the above conditions represent a drawback.

SUMMARY OF THE INVENTION

Therefore it is an object of the present invention to create a capacitor element with patterned electrode areas for use in capacitive measuring devices, eliminating the aforementioned drawbacks and making it possible to arrange a substantially increased number of electrode surfaces on such elements of comparable dimensions. Such an improvement shall not be traded off against the clearly definable capacitance of the capacitor at any mutual position of the capacitive elements of the capacitor.

The invention solves this problem by providing a capacitor element with patterned electrode-areas for use in capacitive measuring devices with mutually displaceable capacitor parts to change the capacitance of the measuring device as a function of the relative positions of the capacitor parts, a plurality of individual electrode areas being arranged on a first side of an insulating substrate and the conducting strips electrically connecting these aereas to each other and to terminals being disposed on a second side of said substrate wherein said conducting strips are electrically connected on their back sides from said second side of said substrate through a plurality of contact holes or electrically conducting ducts arranged in said substrate, said electrode areas uninterruptedly covering said contact holes or ducts.

BRIEF DESCRIPTION OF THE DRAWING FIGURES

FIG. 1 is a conventional capacitor element with patterned electrode areas shown in topview and on an enlarged scale.

FIG. 2 is the capacitor element of FIG. 1 shown from the rear.

FIG. 3 is an enlarged cross-section of a part of the capacitor element of FIGS. 1 and 2.

FIG. 4 is an embodiment of a capacitor element of the present invention with patterned electrode-areas in the form of circle-sectors.

FIG. 5 is the capacitor element of FIG. 4 seen from rear.

FIG. 6 is an enlarged cross-section of a part of the capacitor element of FIGS. 4 and 5.

DETAILED DESCRIPTION OF THE INVENTION

FIGS. 1 through 3 illustrate a capacitor element with patterned electrode-areas according to the state of the art. FIG. 1 shows that because of the inner contact holes 2 at the tips of each sector electrode area 1 which pass through both the substrate 3 and the copper laminate of the electrode areas 1 on the front side of the capacitor element and the conducting strips 4 on its back side (FIG. 2) it is impossible to make the circle-sector electrode areas 1 arbitrarily narrow. Therefore it is further impossible in the case of such a capacitor element of approximately 20 mm outside diameter to arrange substantially more than the shown sixteen circle-sector electrode areas 1. As shown by FIG. 2, these areas are connected on the back side of the capacitor element both to each other and also to terminals 5 by means of the conducting strips 4. In view of the fact also mentioned above that the accuracy of the capacitance per electrode area is adversely affected by the contact holes arranged within the actively used electrode areas, it is impossible, at least as regards precision measuring devices, to arbitrarily shift the contact holes 2 radially outwardly. They must be located toward the center of the capacitor element outside the actively used electrode area. Therefore the accuracy and resolution of this kind of conventional angle measuring devices cannot be substantially improved.

FIGS. 4 through 6 show how this problem can be solved using a capacitor element of the invention with patterned electrode-areas while simultaneously the usually interfering connection elements (terminals 5, 15) projecting beyond the periphery of the otherwise circular capacitor element can be shifted inward into the central zone of the capacitor element usually unsuitable as an active electrode area. This capacitor element of the invention shows the absence of contact holes, or in other designs, contact ducts, that would pass through the layer of the electrode surface pattern, said layer advantageously consisting of copper but also being suitable if consisting of any other substantially electrically conducting material. The circle-sector electrode areas are homgeneous from their outer to their inner edges, and uninterrupted, even though connected on the back side of the capacitor element by conducting strips 14 to each other and to the inside terminals 15.

As a result the invention allows not only the production of capacitive measuring devices of higher resolution than heretofore, but these measuring devices also may be made smaller than previously. Besides, when employing a harmonic geometry of the conducting strips 14 which is rendered possible by the invention, the same mutual interaction will result for all electrode areas, and thereby the accuracy of the measuring device will be enhanced.

To allow that the electrode areas 11 can be connected from the rear, a substrate disk 13 bored-through or equiped with ducts before the electrode areas are deposited on it is used in the manufacture of these capacitor elements of the invention, the electrode areas 11 being laminated, or being deposited by other means well-known in the art, in such a way that the conducting, for instance metallic layer, shall completely cover the contact holes or ducts. The conducting strips which will be arranged on the back side of the substrate disk 13 thereupon are advantageously deposited or etched. The conducting, e.g. metallic, layer also being formed in the contact holes or ducts 12 of the substrate disk 13 and abutting against the electrode areas 11 on the front side of the substrate 13, thus contacting the electrode areas 11 from their back side to the conducting strips 14.

Other manufacturing procedures are also possible, for instance procedures requiring no drilled contact holes, the drilled holes being replaced by conducting ducts in the substrate.

Contrary to the embodiment described in relation to the above discussed figures, the capacitor element with patterned electrode areas in the shape of circle-sectors also can be embodied as a linear capacitive measuring device. This latter embodiment advantageously uses an electrode area pattern in the shape of rectangles arranged as parallel strips transversely to the direction of measurement, the direction of the conducting strips being independent thereof.

It is readily seen that in such a design the contact holes, ducts or points no longer need be outside the active electrode areas, since they are not recognized by the complementary capacitor element not shown in the figures. Since the electrode areas remain wholly intact if contacted in the way described, the contact holes, or ducts or points do not any more affect the capacitance in the capacitor element of the invention and are no longer electrically detected. For a round capacitor element with electrode areas in the form of circle-sectors, it is therefore possible to shift also the inner contact holes or ducts 12 as far toward the outer edge of the capacitor element as required to have them entirely covered even for very narrow circle-sector electrode areas 11.

Because the capacitor elements of the invention can be provided with a multiple of patterend electrode areas compared to conventional capacitor elements, it is possible for the first time to achieve, even for small-size capacitive measuring devices, resolution and measurement accuracy which are a multiple of that possible hertofore. Because the total electrode area can be used as active area, since it is free of any interfering contact holes or ducts it is possible even to make measuring devices of predetermined resolutions smaller than before. This applies obviously also to the capacitor elements of the invention used for linear capacitive measuring devices.

Moreover, the invention allows shifting of the contacts for the terminals usually arranged at the periphery of the capacitor elements with electrode areas in form of circle-sectors, where they are frequently interfering, into the central zone of the capacitor substrate. By that the circle-sector electrode areas can be used as active electrodes up to their outer edges, providing the advantage that their most effective zones are used for the capacitance measurements. Thereby, and without incurring losses, the use of the comparatively ineffective tips of the circle-sector electrode areas can be abandoned. At their place the contats for the terminals, which advantageously are designed to be contacted from the backside of the disk, can be arranged. Thereby the capacitor elements with patterned electrode areas can be bounded circularly both at their centers and at their peripheries, without having to be made larger on that account. A capacitive measuring device for angles incorporating the capacitor element of the invention therefore may be made more compact than a conventional one while offering increased accuracy of measurement and resolution.

I claim:

1. A capacitor element with patterned electrode areas for use in capacitive measuring devices with mutually displaceable capacitor parts to vary the capacitance of the measuring device as a function of the relative positions of the capacitor parts, a plurality of individual electrode areas (11) being arranged on a first side of an insulating substrate (13) and conducting strips (14) electrically connecting these aeras to each other and to terminals (15) being disposed on a second side of said substrate (13), wherein said conducting strips (14) are electrically connected on their back side from said second side of said substrate (13) through a plurality of contact holes or ducts (12) arranged in said substrate (13), said electrode areas (11) uninterruptedly covering said contact holes or ducts (12).

2. The capacitor element defined in claim 1, wherein said electrode areas (11) consist of electrically conducting layers deposited over said first side of said electrically insulating substrate (13) and over the contact holes or ducts (12) in said insulating substrate (13), and said conducting strips (14) consist of an electrically conducting material at least extending from said second side of said substrate (13) through said contact holes or ducts (12) to said back side of said electrode areas (11).

3. The capacitor element defined in claim 1, wherein the pattern of the electrode aeras is of substantially circular shape and said terminals (15) are located radially inward of said pattern of electrode areas.

* * * * *